United States Patent [19]
Kondo

[11] Patent Number: 4,938,410
[45] Date of Patent: Jul. 3, 1990

[54] SOLDERING APPARATUS OF A REFLOW TYPE

[75] Inventor: Kenshi Kondo, Tokyo, Japan

[73] Assignee: Nihon Den-Netsu Keiki Co., Ltd., Tokyo, Japan

[21] Appl. No.: 298,164

[22] Filed: Jan. 18, 1989

[30] Foreign Application Priority Data

| Jan. 19, 1988 | [JP] | Japan | 63-7432 |
| Apr. 30, 1988 | [JP] | Japan | 63-105478 |
| Jun. 3, 1988 | [JP] | Japan | 63-135566 |

[51] Int. Cl.$^5$ .................................. B23K 1/012
[52] U.S. Cl. .......................... 228/180.1; 432/72; 432/152; 432/128; 228/242; 219/388; 219/370
[58] Field of Search ............ 228/180.1, 240, 242, 228/232; 219/388, 400, 370, 375, 85.12, 85.17; 432/72, 128, 152

[56] References Cited

U.S. PATENT DOCUMENTS

| 1,949,716 | 3/1934 | Harsch | 34/223 X |
| 3,752,642 | 8/1973 | Early et al. | 432/72 X |
| 4,757,800 | 7/1988 | Shei et al. | 34/223 X |
| 4,771,929 | 9/1988 | Bahr et al. | 228/232 |

*Primary Examiner*—Kenneth J. Ramsey
*Attorney, Agent, or Firm*—Stephen F. K. Yee

[57] ABSTRACT

A soldering apparatus of the reflow type contains a preheating chamber and a reflow chamber which are provided with a plurality of heaters for heating printed circuit boards with chips temporarily mounted thereon with solder pastes during conveyance by a conveyor. The heaters are provided with a screening member and/or a partition member so as to prevent direct radiation of radiant heat from the heaters into the chambers and onto the printed circuit boards and to provide a uniform air flow to be blown uniformly onto the printed circuit boards. The heaters are arranged so as to heat them in such a manner as to increase temperatures in the direction from an inlet to an outlet so as to become higher with a predetermined temperature differential from the previous heater, thus removing bubbles generated upon fusion of the solder pastes and minimizing heat shock to the chips as they are heated. The preheating chamber is further provided with a combustion unit with a catalyst for removing fume and odorous gases generated in the chamber and for circulating the heated air after removal of such fume and gases. These arrangements can provide printed circuit boards of higher quality and with high productivity.

6 Claims, 5 Drawing Sheets

SOLDERING APPARATUS OF A REFLOW TYPE

BACKGROUND OF THE INVENTION

The present invention relates to a soldering apparatus of a reflow type and, more particularly, to a soldering apparatus of a reflow type in which electric parts such as chips temporarily mounted on a printed circuit board are soldered with solder preforms or solder pastes in a reflow chamber of the soldering apparatus after preheating them in a preheating chamber thereof.

A conventional soldering apparatus of the reflow type is arranged in which printed circuit boards on which chips have been temporarily mounted with solder preforms, solder pastes or adhesives are exposed to heated air or far infrared rays to fuse or melt the solder preforms or the like, thus soldering the chips on the printed circuit boards.

Figure 5:
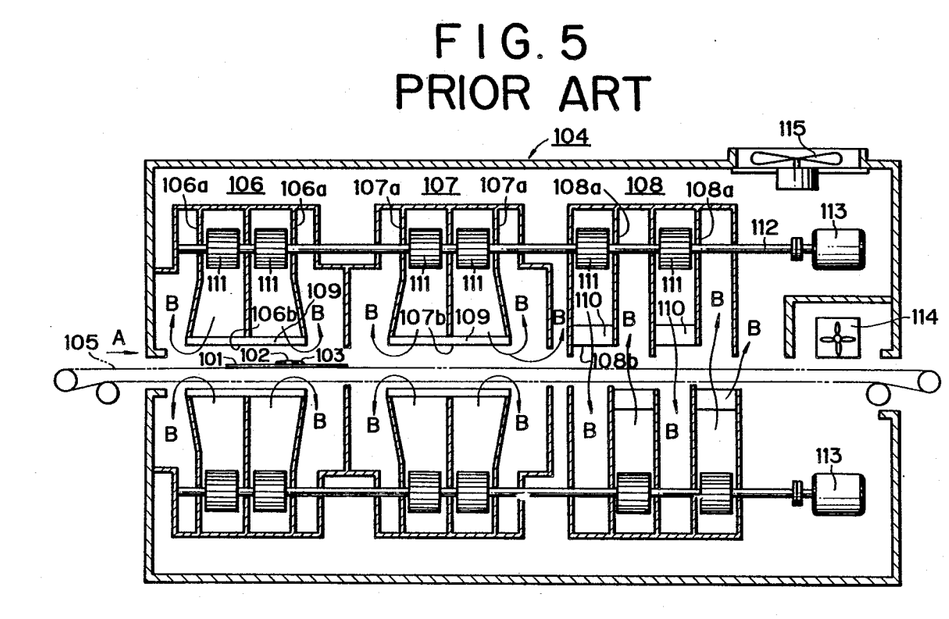
FIG. 5 is a cross-sectional side view showing a conventional soldering apparatus.

One conventional soldering apparatus of the reflow type is shown in FIG. 5 in which printed circuit boards 101 with chips 102 temporarily mounted thereon with solder pastes 103 are placed on a belt conveyor 105 of a metal mesh being conveyed on a direction shown by the arrow A. The soldering apparatus 104 is provided with a first preheating chamber 106 and a second preheating chamber 107 at positions along the direction of conveyance of the belt conveyor 105 and symmetrically above and below the belt conveyor 105. The first and second preheating chambers 106 and 107 are provided each with an air inlet 106a and 107a and a discharge outlet 106b and 107b, respectively. Air is sucked into the chambers 106 and 107 through the air inlets 106a and 107a, respectively, and the air is heated with a heater 109, such as an electric sheathed heater or a far infrared rays heater, mounted at the respective discharge outlets 106b and 107b, to temperatures as high as approximately 140° C., for example, below the fusion point of the solder pastes 103 or the like, thus preheating the printed circuit boards 101 being conveyed in the chambers 106 and 107. The preheated printed circuit boards 101 are then conveyed to a reflow chamber 108 in the soldering apparatus 104, which is provided at a discharge exit 108b thereof with a heater 110, such as an electric sheathed heater or far infrared rays heater. The printed circuit boards 101 are in turn heated with air sucked from an air inlet 108a and heated by the heater 110 at temperatures as high as 215° C., at the fusion point of the solder pastes or the like or higher, thus soldering the chips 102 on the printed circuit boards 101. The heated air is discharged through the discharge outlet 108b. The preheating chambers 106 and 107 and the reflow chamber 108 are further provided each with a fan 111 which is connected through a rotary shaft 112 to each other and to a motor 113. The fans 111 then ventillate heated air in and from the chambers in a direction shown by the arrow B. The soldering apparatus 104 is also provided with a cooling fan 114 for cooling the fused or melted solder pastes 103 to solidify them and ensuring the fixed mounting of the chips 102 to the printed circuit boards 101.

The heater 109 or 110, such as an electric sheathed heater or a far infrared rays heater, generates radiant heat containing far infrared rays, and the far infrared rays have the advantage that they are likely to heat even the inside of the chips 102 as compared with a heating system applying a thermal conduction of heated air. It is to be noted, however, that, as the solder pastes 103 have a larger reflectance than the chips 102, the far infrared rays require a longer time for heating the solder pastes 103 than for heating the chips 102, whereby the chips 102 are heated earlier than the solder pastes 103 and it takes a longer time to solder the chips 102.

The heating system using the heater 109 or 110 is more difficult in setting heating requirements than the heating system using heated air because there are many varieties in kinds of printed circuit boards 101 and their sizes.

Furthermore, when a reflecting plate is provided for reflecting heat from the heater 109, 110, the reflecting surface may become coated with flux scattered from the solder pastes 103, reducing the thermal efficiency of the heater 109, 110.

The air heated by the heaters 109 in the first and second preheating chambers 106 and 107 is ventillated downwardly by the ventillating fan 111, but this causes a turbulence to occur. The heating by the air in a turbulent state in association with the heater 109, 110 has the tendency to cause irregularity in heating of the printed circuit boards 101, particularly in the direction perpendicular to a direction (shown by the arrow A) of conveyance of the printed circuit boards 101, namely, in a widthwise direction thereof. In other words, a difference in temperatures may be likely to occur between a middle portion of the printed circuit board 101 and both end portions in a widthwise direction thereof. If such printed circuit boards 101 are conveyed for soldering to the reflow chamber 108 where the air is likewise in a turbulent flow, the solder pastes 103 are fused in such an irregular state that uniform soldering cannot be ensured.

Accordingly, it is required to block impact upon printed circuit boards 101 of radiant heat including far infrared rays generated from the heater 109, 110.

In order to ensure good adherence of the solder pastes 103 to the printed circuit boards 101, the solder pastes 103 should be heated rapidly and thereafter cooled rapidly. It is to be noted, however, that, when printed circuit boards 101 and chips 102 at ambient temperatures as high as approxmately 20° C. are rapidly heated by direct contact with air heated to temperatures as high as 215° C. or exposure to far infrared rays, they are likely to undergo heat shock causing damages. Further, fluxes and volatile ingredients in the solder pastes 103 are caused to evaporate upon fusion by heating and air bubbles may be formed within the solder pastes 103. However, a portion of such air bubbles remains trapped within the solder pastes 103 rendering the pastes porous, thus decreasing the bonding intensity of the solder pastes 103. Furthermore, air bubbles generated at the surface portions of solder pastes 103 scatter fused solder pastes 103 which adhere to wiring of chips 102 and print circuit boards 101, thereby damaging the chips 102 and short-circuiting the wiring. These disadvantages impair the reliability and quality of printed circuit boards 101.

For the conventional soldering apparatus 104, the air heated in the preheating chambers 106, 107 and the reflow chamber 108 and withdrawn once therefrom is then directed back to the ventillating fans 111 through flow passages disposed in the chambers 106, 107, 108 after the air has heated the solder pastes 103 in the chambers 106, 107, 108. It is to be noted that fusion of the solder pastes 103 with the heated air generates smoke or fumes and odorous gases upon heating of the fluxes or the like. The smoke and gases are directed by the ventillating fans 111 to the preheating chambers 106, 107 and the reflow chamber 108 together with the heated air through the flow passages. As a matter of course, these smoke and gases cause dirt to adhere on the inner wall surfaces of the chambers 106, 107, 108, the heaters 109, 110, the fans 111 and the withdrawing duct 115. Furthermore, a portion of the smoke and gases escapes outside the soldering apparatus 104 of the reflow type, impairing operational circumstances, causing pollution and so on.

It is thus required to remove the smoke or fumes and the gases.

SUMMARY OF THE INVENTION

Therefore, the present invention has an object to provide a soldering apparatus of a reflow type capable of blocking radiant heat including far infrared rays generated from the heaters and as a consequence removing impact of radiant heat upon printed circuit boards due to far infrared rays, thus preheating the printed circuit boards as a whole at uniform temperatures in the preheating chambers and fusing the solder pastes in uniform manner in the reflow chamber.

The present invention has another object to provide a soldering apparatus of a reflow type adapted to remove air bubbles upon fusion of solder pastes and to prevent solder paste scattering during fusion of the solder pastes due to generation of the bubbles.

The present invention has a further object to provide a soldering apparatus of a reflow type capable of removing smoke or fumes and odorous gases generated from the heated solder pastes by means of a combustion action through a catalyst system by further heating the heated air to higher temperatures and capable of re-utilizing heat generated.

In order to achieve these objects the present invention is directed to a soldering apparatus of the reflow type consisting of a conveyor means for conveying from an inlet to an outlet of the apparatus a printed circuit board on which a chip is mounted by solder paste coated thereon, a preheating chamber for preheating the printed circuit board, a reflow chamber for soldering the chip on the printed circuit board by fusion of the solder paste, and a fan disposed in each of the preheating chamber and the reflow chamber, which comprises a heater each disposed along a side wall of the preheating chamber and in the reflow chamber for heating air therein; a screening member each disposed in the preheating chamber and in the reflow chamber for preventing radiant heat from radiating directly in the preheating chamber and in the reflow chamber; and an air inlet and an air outlet each disposed in the preheating chamber and in a reflow chamber for circulating air heated therein by the fan. Furthermore, the soldering apparatus is provided with a flow transforming member in the preheating chamber and/or in the reflow chamber in order to heat the printed circuit board in uniform manner by transforming a turbulent flow of heated air into a laminar flow.

With the arrangement, is radiant heat generated from the heaters can be blocked to prevent the direct heating of the printed circuit boads by the radiant heat. Furthermore, the air heated in the preheating chamber and in the reflow chamber is blown to the printed circuit boards as a whole in uniform manner by allowing the heated air to pass through the air flow transforming member as a laminar flow, in addition to forcible circulation of the heated air by the ventillating fans.

In order to achieve another object, of the present invention is directed to the soldering apparatus of the reflow type consisting of a conveyor means for conveying from an inlet to an outlet thereof a printed circuit board on which a chip is mounted by solder paste coated thereon, a preheating chamber for preheating the printed circuit board, a reflow chamber for soldering the chip on the printed circuit board by fusion of the solder paste, and a fan disposed each in the preheating chamber and the reflow chamber, which comprises a plurality of heaters mounted in the preheating chamber so as to provide the air with a temperature differential in an ascending gradient manner from the inlet to the outlet of the conveyor means; a plurality of heaters mounted in the reflow chamber so as to provide the air with a predetermined temperature differential in an ascending gradient manner from the inlet to the outlet thereof; a flow transforming member disposed for transforming a flow of the heated air in the preheating chamber and in the reflow chamber; and a partition member mounted between one heater and another so as to transform a flow of the heated air in the preheating chamber and in the reflow chamber in order to retain the predetermined temperature differential.

With the above arrangement, while the heated air in the preheating chamber and in the reflow chamber is circulated forcibly by rotation of the ventillating fans and a flow of the heated air in a turbulent state is transformed into a laminar flow upon passage through the partition member, the air is maintained at a predetermined temperature differential in a gradient manner by the heaters thus heating the printed circuit board being conveyed at gradiently higher temperatures from the inlet to the outlet of the conveyor means and removing thoroughly air bubbles generating upon fushion of the soldler pastes.

In order to achieve the further object, the present invention is directed to the soldering apparatus of the reflow type consisting of a conveyor means for conveying a printed circuit board on which a chip is mounted by solder paste coated thereon, from an inlet to an outlet, a preheating chamber for preheating the printed circuit board, a reflow chamber for soldering the chip on the printed circuit board fusion of the solder paste, and a fan disposed each in the preheating chamber and the reflow chamber, which further comprises a combustion unit for removing smoke or fumes and odorous gases generated in the preheating chamber, the combustion unit being connected at its inlet and outlet sides to the preheating chamber through a connection member.

The above arrangement permits removal of the smoke or fumes and the gases generated in the preheating chamber and in the reflow chamber through a combustion action by direct contact thereof with a catalyst in the combustion unit. The air from which the smoke or fumes and the gases have been removed is returned to the preheating and reflow chambers through the connecting member such as pipes.

DETAILED DESCRIPTION OF THE PREFERRED EMBODIMENTS

Figure 1:
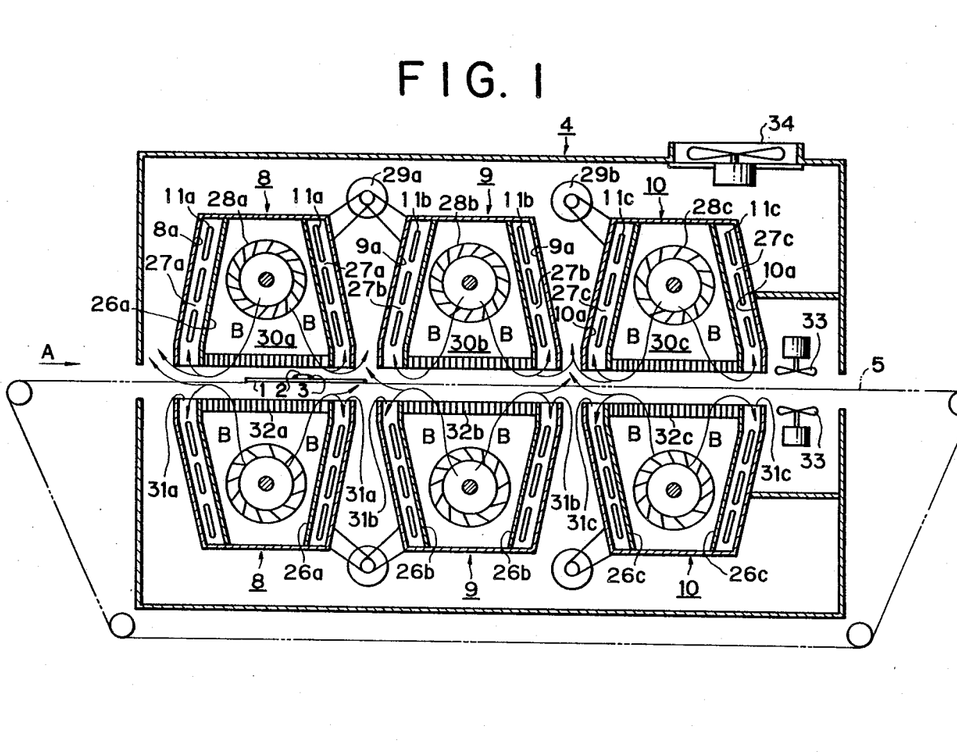
FIG. 1 is a cross-sectional side view showing one example of the soldering apparatus according to the present invention.

Referring to FIG. 1, a soldering apparatus 4 of the reflow type as a preferred embodiment of the soldering apparatus according to the present invention is shown to comprise a first preheating chamber 8, a second preheating chamber 9, and a reflow chamber 10, each of the first and second preheating chambers 8 and 9 and the reflow chamber 10 each being symmetrically disposed so as to vertically interpose a belt conveyor 5 of a metal mesh. The first preheating chamber 8 is disposed at a position upstream of the second preheating chamber 9 with respect to a belt conveyor 5 of a metal mesh, and the reflow chamber 10 is disposed at a position downstream of the second preheating chamber 9 with respect thereto. This arrangement permits the heating of a printed circuit board 1 on which a chip 2 is temporarily mounted by a solder paste 3 in order during horizontal movement of the belt conveyor 5 that conveys the printed circuit board 1 in a direction indicated by the arrow A.

The conveyor means may be a conveyor chain with holding claws for holding printed circuit boards.

The first preheating chamber 8 is provided with a heater 11a, such as an electric sheathed heater, far infrared rays heater or the like, on a side wall 8a of the chamber, and air therein is heated at approximately 160° C., heating the printed circuit boards 1 to rapidly raise temperatures to approximately 140 ° C. The first preheating chamber 8 is further provided with a screening plate 26a in parallel to an inner surface of the outer wall 8a so as to block direct radiation of radiant heat containing far infrared rays generated from the heater 11a into the first preheating chamber 8. The screening plate 26a forms a heating sub-chamber 27a in association with the side wall 8a on which the heater 11a is mounted and the provision of the screening plate 26a prevents direct radiant heat from the printed circuit boards 1 with the chips 2 mounted thereon. On the first preheating chamber 8 is mounted a ventillating fan 28a for circulating the heated air in the chamber, such as multiblade fan or the like, and a flow passage (not shown) is provided communicating the heating sub-chamber 27a with the inside of the ventillating fan 28a, through which the air heated in the heating sub-chamber 27a by the heater 11a is directed into the ventillating fan 28a operable by a motor 29a and the heated air is circulated in the first preheating chamber 8. The first preheating chamber 8 is provided with an air outlet 30a at a position underneath the chamber, and the air outlet 30a in turn is provided with an flow transforming plate 32a at a position underneath the chamber so as to face the printed circuit boards 1 with the chips 2. The air flow transforming plate 32a serves to transform a turbulent flow in the chamber into a laminar flow. The heated air withdrawn from the first preheating chamber 8 passes as a laminar flow through the air flow transforming plate 32a in a direction as shown by the arrow B and is blown uniformly onto the printed circuit boards 1 with the chips 2 being conveyed by the belt conveyor 5. The second preheating chamber 9 has substantially the same structure as described immediately hereinabove for the first preheating chamber 8. As shown in FIG. 1, identical elements are provided with identical reference numerals to which reference symbol "b" is added. More specifically, for example, the second preheating chamber 9 is likewise provided with a heater 11b for heating air therein at temperatures as high as 140° C. so as at heat the printed circuit boards 1 and maintain them at 140° C. in stable manner while they are conveyed by the belt conveyor 5.

The printed circuit boards 1 are then conveyed to the reflow chamber 10 which in turn has substanially the same structural feature as the first preheating chamber 8 in which identical elements are provided with identical reference numeral with reference symbol "c" after the reference numeral.

The air heated in the heating sub-chambers 27a, 27b, and 27c of the preheating chambers 8 and 9 and the reflow chamber 10 is directed through the flow passage therefrom into the respective chamber and blown by the vetillating fans 28a, 28b, and 28c, respectively, onto the printed circuit boards 1 in the direction as shown by the arrow B. More specifically, the heated air withdrawn through the air flow transforming plates 32a, 32b, and 32c at the air outlets 30a, 30b, and 30c is allowed to rise in the soldering apparatus 4 for circulation and then sucked again into the heating sub-chambers 27a, 27b, and 27c, respectively. The heated air, initially a turbulent flow caused by the fans 28a, 28b and 28c, becomes a laminar flow after passing through the flow transforming plates 32a, 32b, and thus the heated air is blown in a uniform manner and as a consequence heating the printed circuit board 1 uniformly in a widthwise direction of the printed circuit board 1.

The printed circuit boards 1 with the chips 2 soldered thereon are then conveyed out of the reflow chamber 10 and cooled by a cooling fan 33. Exhaust air and gases in the soldering apparatus 4 are withdrawn by an exhaust fan 34 mounted on an upper wall of the soldering apparatus.

The uniform heating of the printed circuit board 1 in the widthwise direction in the first preheating chambers 8 and 9 and in the reflow chamber 10, respectively, permits a uniform fusion of the solder pastes 3, causing no irregularity on soldering and providing printed circuit boards 1 of higher quality.

Although it is preferred that the air flow transforming plate 32 be disposed each in the first preheating chambers 8 and 9 and in the reflow chamber 10, it is possible to provide only the reflow chamber 10 with the air flow transforming plate 32c in order to cause no irregularities in heating the printed circuit boards 1 without direct contact with radiant heat containing far infrared rays generated by the heater 11c.

In this embodiment, no radiant heat from the heater 11 is used so that it will take a longer time to fuse or melt the solder pastes 3. However, this time may be shortened by an increase in flow velocity of the heated air.

Figure 2:
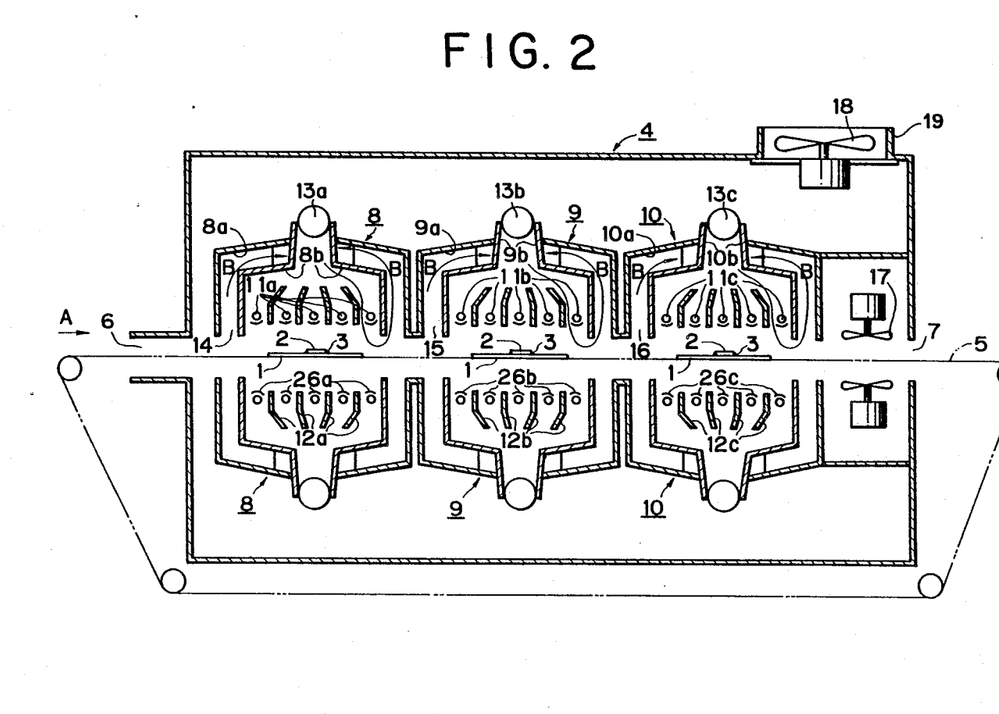
FIG. 2 is a cross-sectional side view showing another example of the soldering apparatus according to the present invention.
Figure 3:
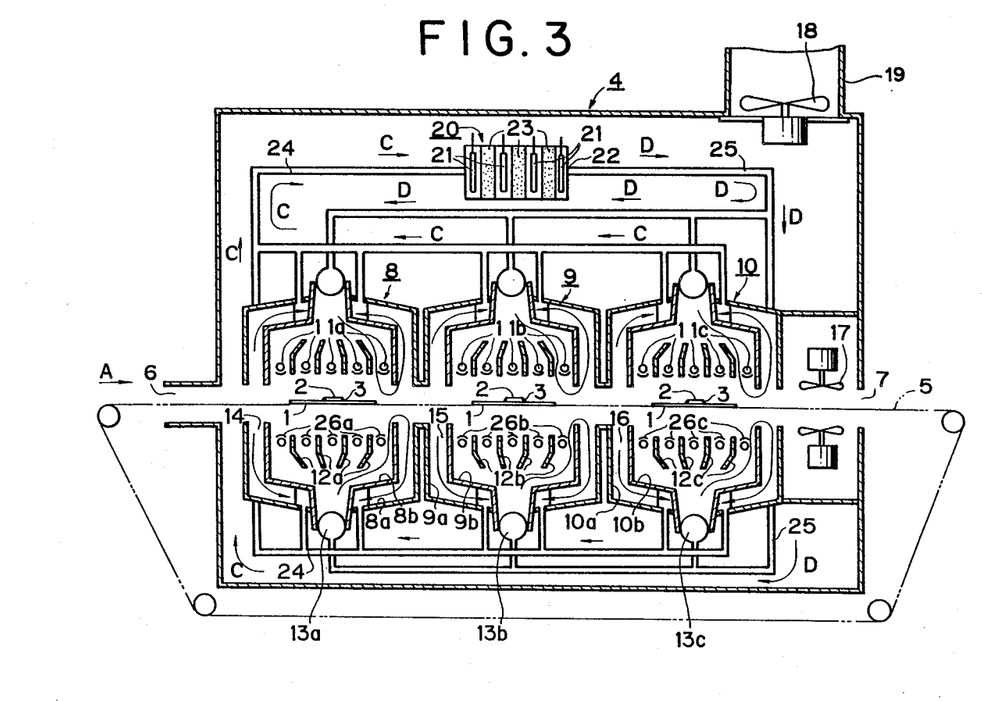
FIG. 3 is a cross-sectional side view showing a further example of the soldering apparatus according to the present invention.

Turning now to FIGS. 2 and 3, a soldering apparatus 4 of the reflow type recording to the present invention comprises a first preheating chamber 8, a second preheating chamber 9, and a reflow chamber 10, each of the chambers being shown to be substantially identical to each other, and identical elements are provided with identical numerals with different reference symbols "a", "b", and "c", respectively.

The first and second preheating chambers 8 and 9 and the reflow chamber 10 each is disposed symmetrically at vertical positions so as to interpose a belt conveyor 5 made out of a mesh metal, for example, which conveys a printed circuit board 1 with a chip 2 mounted with solder paste 3 from the first preheating chamber 8 through the second preheating chamber 9 to the reflow chamber 10.

As shown in FIGS. 2 and 3, a plurality of heaters 11a are disposed at an outlet portion of the first preheating chamber 8, horizontally and parallel to a direction of conveyance of the belt conveyor 5, shown by the arrow A, so as to heat the printed circuit boards 1 in such a manner that air is heated in increasingly higher temperatures in the direction shown by the arrow A, from an inlet 6 to an outlet 7 of the soldering apparatus 4. This arrangement of the heaters permits air to be heated, from virtually ambient temperature at the inlet portion of the chamber, to increasingly higher temperatures, to the fusion point of the solder paste 3, in virtually a linear manner from the first preheating chamber 8 through the second preheating chamber 9 to the reflow chamber 10. Between the heaters 11a is mounted a partition plate 12a in order to retain air heated by the respective heater 11a in a space defined between the inner wall 8b of the chamber and the adjacent partition plate 12a or between the adjacent partition plates 12a, at a predetermined temperature differential from the adjacent space. Underneath each of the heaters 11a is provided a screening plate 26a such that radiant heat generated from the heater 11a is not radiated directly on the chips 2 and the printed circuit boards 1.

With this arrangement, as shown in FIG. 1, the first preheating chamber 8 of the soldering apparatus 4 is designed such that the printed circuit boards 1 conveyed from the inlet 6 thereinto are heated by air heated by a series of the heaters 11a in order at higher temperatures and blown by a ventillating fan 13a onto the solder pastes 3 in the direction as shown by the arrow B so as to cause the solder pastes 3 to gradually release fluxes and volatile ingredients generated from the solder pastes 3 as the belt conveyor 5 is moved. The heated air blown onto the printed circuit boards 1 is then returned for circulaton to the ventillating fan 13a through a flow passage 14 defined by the outer wall 8a and the inner wall 8b of the first preheating chamber 8 in the direction as shown by the arrow B.

As shown in FIGS. 2 and 3, the second preheating chamber 9 and the reflow chamber 10 are constructed in substantially the same manner as the first preheating chamber 8. It is thus to be noted that fluxes and volatile ingredients generated from the solder pastes 3 are generally released and thoroughly removed until the printed circuit boards 1 reach the reflow chamber 10, whereby no bubbles are left in the solder pastes 3.

The printed circuit boards 1 with the chips 2 soldered thereon are then conveyed out of the reflow chamber 10 and cooled by a cooling fan 17.

Exhaust air and gases in the soldering apparatus 4 are withdrawn by an exhaust fan 18 mounted on an upper wall of the soldering apparatus 4.

Referring specifically to FIG. 3, the soldering apparatus 4 has substantially the same structure as the soldering apparatus 4 shown in FIG. 2, as have been described hereinabove, with the exception that a combustion unit 20 is mounted for removing smoke or fumes and odorous gases. The combustion unit 20 comprises a heater 21, a temperature governing device 22, and a catalyst 23, and it may be in a form such as a frame with a wire net mounted inside so as to accommodate the catalyst 23 of an oxidizable type in a granular state, such as a platinum-alumina system, for burning the smoke or fumes and gases for oxidation. The heater 21 is designed so as to heat the catalyst 23 at temperature optimal to burn the smoke or fumes and gases, and the temperature governing device 22 is designed so as to regulate the temperatures around approximately 250° C. for optimal combustion. The combustion unit 20 is communicated at its inlet side, on the one hand, through a pipe 24 with the flow passage 14a of the first preheating chamber 8, the flow passage 14b of the second preheating chamber 9, and the flow passage 14c of the reflow chamber 10. The air containing the smoke or gases is led to the combustion unit 20 through the pipe 24 in a direction as shown by the arrow C. The combustion unit 20 is further communicated at its outlet side, on the other hand, through a pipe 25 with the ventillating fan 13a of the first preheating chamber 8, the fan 13b of the second preheating chamber 9, and the fan 13c of the reflow chamber 10, and the air from which the smoke and gases have been removed is then returned to the first and second preheating chambers 8 and 9 and the reflow chamber 10 in a direction as shown by the arrow D.

The temperature of the heated air to be fed to the ventillating fan 13 from the combustion unit 20 is adjusted by opening or closing a damper (not shown) mounted each in the flow passage 14, 15, and 16. The surplus of the heated air is exhausted outside with an exhaust fan 18 through an exhaust duct 19 disposed on an upper portion of the soldering apparatus 4.

Figure 4:
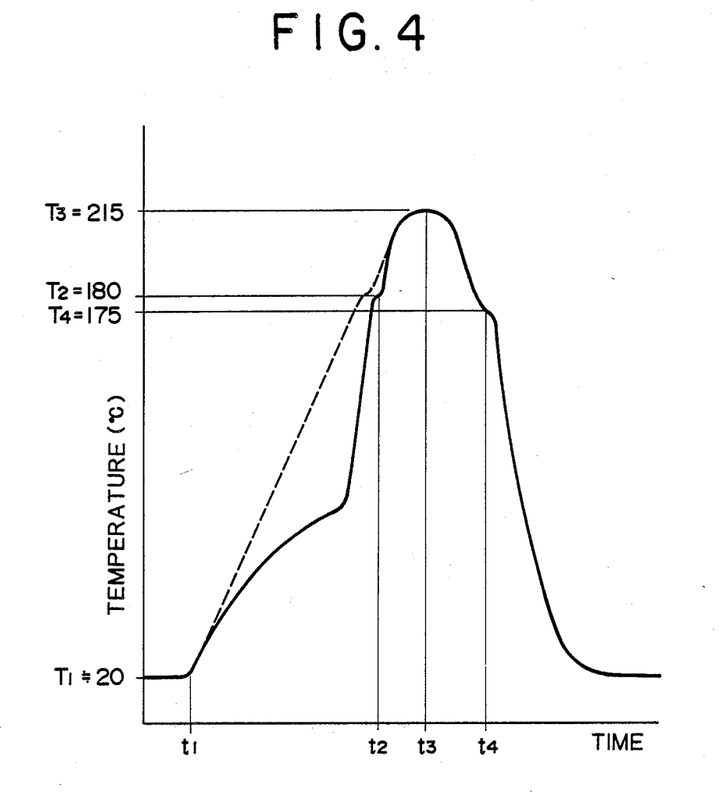
FIG. 4 is a graph showing a relationship of conveyance time of a printed circuit board with temperature.

FIG. 4 shows the relationship of conveyance times of a printed circuit board with temperatures, in which the solid line represents conventional temperature characteristic and the broken lines represents temperature characteristic according to an example of the present invention. In FIG. 4, $t_1$ is a time at which the solder pastes 3 starts being heated by hot air heated by the heater 11, $t_2$ is a time at which the soldering starts in the reflow chamber 10, $t_3$ is a time at which the solder pastes 3 reach a maximum temperature and the cooling starts, $t_4$ is a time at which fused solder pastes 3 starts solidifying, $T_1$ is a temperatures of a printed circuit board 1 and the solder pastes 3 at ambient temperature (approximately 20° C.), $T_2$ is a temperature (approximately 180° C.) at which the solder pastes 3 fuse, $T_3$ is a maximum temperature (approximately 215° C.), and $T_4$ is a temperature (approximately 175° C.) at which the solder pastes 3 start solidifying.

As shown in FIG. 4, the temperature of the printed circuit boards 1 increases in a linear relationship from $T_1$ to $T_2$ during a period of times from $t_1$ to $t_2$, thus preheating them to a sufficient level. This permits bubbles generated at the surface of the solder pastes 3 to scatter gradually without scattering the fused solder pastes 3, and eventually all bubbles to be fully removed.

In accordance with one aspect of the present invention, the soldering apparatus of the reflow type with the arrangement as have been described hereinabove is provided with the heaters each on side walls of the preheating chambers and of the reflow chamber for heating air therein and with screening plates along the heaters in order to prevent direct radiation of radiant heat from the heaters into the preheating chambers and the reflow chamber. Furthermore, the preheating chambers and the reflow chamber of the soldering apparatus are provided each with the air inlet and the air outlet in order to allow the heated air to be circulated in the chamber with the ventillating fan. These arrangement of the soldering apparatus according to the present invention can prevent damages of chips due to heat to be otherwise caused by a fusion of the solder pastes prior to the heating of the printed circuit boards, thereby providing printed circuit boards with chips of higher quality and permitting an easy adjustment of temperatures in the chambers because of the air in the chambers being heated by the heaters mounted within the chambers. Thus productivity is improved to a greater extent.

The preheating chambers and the reflow chamber are provided each at its air outlet portion facing the belt conveyor with the air flow transforming member so that the heated air is blown as a laminar flow onto the printed circuit boards in uniform manner, thus preventing irregularities in fusing the solder pastes and soldering the chips to provide the printed circuit boards of higher quality. The provision of the heaters in the preheating chambers permits uniform preheating of the printed circuit boards so that the printed circuit boards conveyed to the reflow chamber can be uniformly heated, leading to a uniform fusion of the solder pastes. This has the advantage that no irreguarities are caused in soldering and printed circuit boards of uniform and higher quality can be produced.

In accordance with another aspect of the present invention, the soldering apparatus of the reflow type is provided each with a plurality of heaters at its air outlet portion of the preheating chambers and the reflow chamber in a direction horizontally from the inlet to the outlet of the belt conveyor so as to heat air in the chambers at higher temperatures in ascending manner. Furthermore, it is provided with the partition member between the heaters so as to transform a flow of the heated air in a turbulent state in the chambers into a laminar flow so as to retain a predetermined temperature differential between adjacent spaces seperated and defined by the partition members. This arrangement of the heaters permits the printed circuit board to be gradually heated to increasingly higher temperatures, with predetermined temperature differentials, thus gradually scattering bubbles generated on a surface of the solder paste and preventing the solder paste from adhering to the chips and the wiring. This arrangement permits a thorough removal of air bubbles generated in the fused solder pastes, increasing strength of the solder bonding of the chips on the printed circuit boards and providing printed circuit boards of higher quality.

In accordance with a further aspect of the present invention, the soldering apparatus of the reflow type is provided with the combustion unit adapted to remove smoke and odorous gases generated from fluxes of the solder pastes from the heated air in the chambers with the aid of the catalyst system in the combustion unit and to return the heated air to the chambers through the pipe member after removal of smoke and odor, thus minimizing amounts of smoke which adhere to the printed circuit boards being conveyed through the reflow chamber, the inner walls of the chambers, the ventillating fans, the exhaust fan, the ducts and so on and improving operation circumstances. This is also advantageous from the viewpoint of anti-pollution.

The cumbustion unit to be mounted to the soldering apparatus of this type may be of a simplified structure, thus reducing expenses for prevention of pollution in addition to improvement in work circumstances.

In the soldering apparatus, the heated air is re-used by circulation after removal of smoke and gases, thus minimizing a degree of oxidation in the solder pastes and providing printed circuit boards of higher quality.

What is claimed is:

1. In a solder apparatus of the reflow type having a conveyor means for conveying a printed circuit board on which a chip is temporarily mounted with a solder paste, a preheating chamber for preheating the printed circuit board, a reflow chamber for effecting soldering of the chip on the printed circuit board by fusion of the solder paste, and a fan for circulating air in each of the chambers, the improvement comprising, for each of the preheating chamber and the reflow chamber:
    a heater mounted on a sidewall of the chamber
    a screening member mounted adjacent to said heater to prevent direct radiation of heat into the chamber, and to form with said sidewall a heating sub-chamber;
    an air inlet for directing air into said sub-chamber to be heated by said heater, and an air outlet for directing heated air to the circulating fan;
    an air discharge disposed adjacent to said conveyor means for discharging heated air from said chamber onto said conveyor means and printed circuit board; and
    as air flow transforming member disposed in said air discharge for transforming turbulent air flow to laminar air flow to provide a uniform flow of heated air from said discharge.

2. A soldering apparatus as claimed in claim 1, further comprising a combustion unit with a catalyst for removing smoke and odoring gases generated in the preheating chamber and circulating heated air to the preheating chamber.

3. In a soldering apparatus of the reflow type having a conveyor means for conveying a printed circuit board from an outlet to an outlet on which a chip is temporarily mounted with a solder paste, a preheating chamber for preheating the printed circuit board, a reflow chamber for soldering the chip on the printed circuit board by fusion of the solder paste and a fan for circulating air in each of the chambers, the soldering apparatus comprises:
    a plurality of heaters mounted at an air outlet portion of the preheating chamber and spaced apart in parallel to the direction of conveyance of the conveyor means for heating air to be blown onto the printed circuit board being conveyed by the conveyor means, at increasingly higher temperatures from the inlet to the outlet of the conveyor means, so as to heat the printed circuit board with a predetermined temperature differential:
    a plurality of heaters mounted at an air outlet portion of the reflow chamber and spaced apart in parallel to the direction of conveyance of the conveyor means for heating air to be blown onto the printed circuit board being conveyed by the conveyor means, at increasingly higher temperatures from the inlet to the outlet of the conveyor means, so as to heat the printed circuit board with a predetermined temperature differential; and
    a partition member mounted so as to separate each of the plurality of the heaters in the preheating chambers and in the reflow chambers so as to provide a flow of air heated therein to be blown onto the printed circuit board being conveyed by the conveyor means and to retain a predetermined temperature differential between adjacent separate spaces in which each of the heaters is disposed.

4. A soldering apparatus as claimed in claim 3, further comprising:
a screening member mounted adjacent to each of the heaters in the preheating chamber and in the reflow chamber so as to prevent direct radiation of the radiant heat into each of the chambers and to the printed circuit board.

5. A soldering apparatus as claimed in claim 4, further comprising a combustion unit with a catalyst for removing smoke and odorous gases generated in the preheating chamber and for circulating heated air to the preheating chamber.

6. A soldering apparatus as claimed in claim 3, further comprising a combustion unit with a catalyst for removing smoke and odorous gases generated in the preheating chamber and for circulating heated air to the preheating chamber.

* * * * *